United States Patent [19]

Pinch et al.

[11] Patent Number: 4,799,134
[45] Date of Patent: Jan. 17, 1989

[54] OPTICAL REFLECTOR SYSTEM FOR FLUORESCENT LIGHTING FIXTURES

[75] Inventors: David G. Pinch, Mesa, Ariz.; Spencer C. McGrath, 11055 N. 55th Ave., Glendale, Ariz. 85304

[73] Assignee: Spencer McGrath, Merced, Calif.

[21] Appl. No.: 885,656

[22] Filed: Jul. 15, 1986

[51] Int. Cl.⁴ .................. F21S 3/00; H01R 11/26
[52] U.S. Cl. .................. 362/217; 362/221; 362/241; 362/260; 362/320; 439/226; 439/236; 439/628
[58] Field of Search .......... 362/211, 221, 217, 220, 362/240, 346, 260, 247, 225, 319, 320, 225; 439/225, 226, 228, 235, 236, 628

[56] References Cited

U.S. PATENT DOCUMENTS

| | | | |
|---|---|---|---|
| 2,487,468 | 11/1949 | Noysmith | 362/221 |
| 4,112,483 | 9/1978 | Small, Jr. et al. | 362/217 |
| 4,277,820 | 7/1981 | Bostonian | 362/260 |
| 4,336,576 | 6/1982 | Crabtree | 362/241 |
| 4,403,275 | 9/1983 | Oser | 362/220 |
| 4,536,830 | 8/1985 | Wisniewski | 362/346 |
| 4,562,517 | 12/1985 | Pankin | 362/241 |
| 4,652,983 | 3/1987 | Mytels | 362/241 |

Primary Examiner—Ira S. Lazarus
Assistant Examiner—D. M. Cox
Attorney, Agent, or Firm—Gregory J. Nelson

[57] ABSTRACT

A fluorescent lighting fixture or luminaire in which the conventional number of light source is de-lamped to a lesser number and which provides acceptable light levels and distribution of light. A flexible reflector of specular reflective material is installed in the fixture above the replacement lamp. The reflector material by virtue of its flexiblity will assume a generally parabolic configuration to re-direct the light from the fixture. Thus, with the reflector, two-lamp luminaires will de-lamp to one-lamp and four-lamp luminaires may be de-lamped to two-lamps, and so on. The invention also provides an electrical connector for positioning a new lamp at a central location and which connector is engageable in the existing lamp holders.

3 Claims, 2 Drawing Sheets

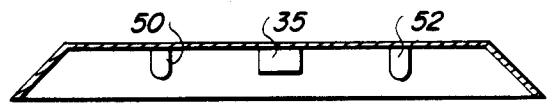
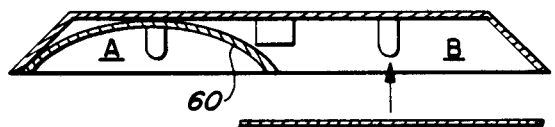
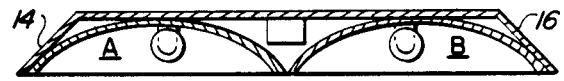
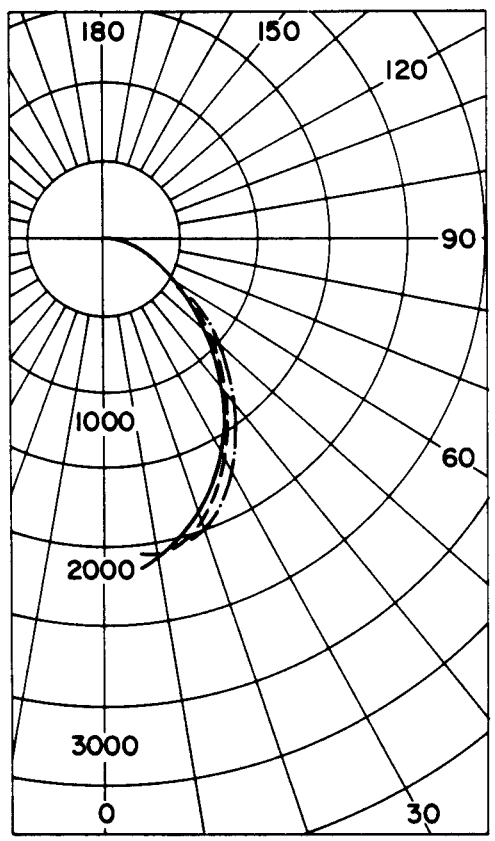
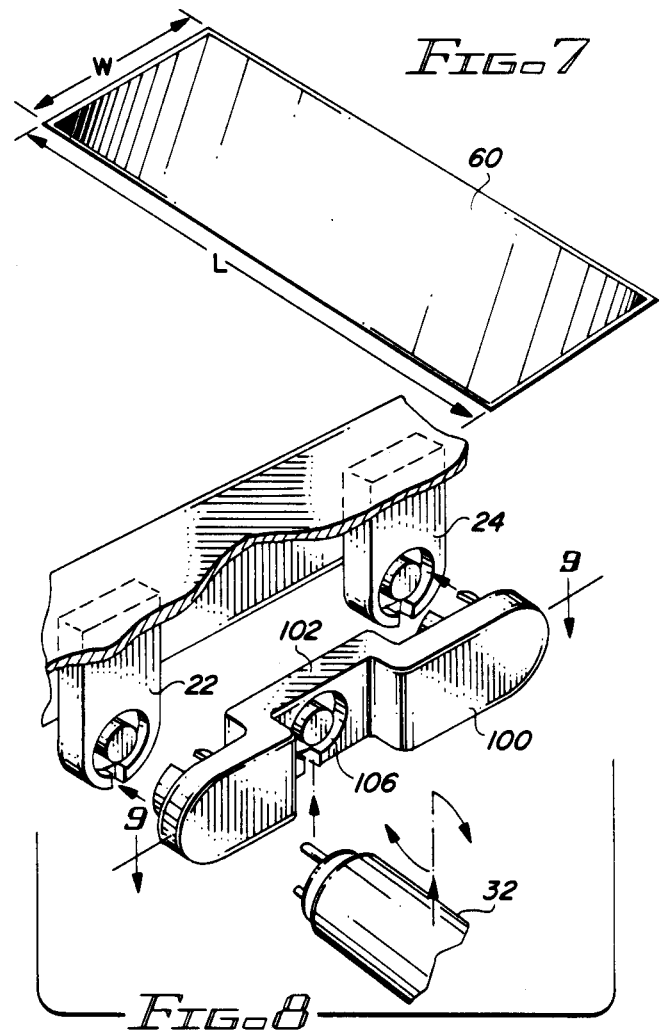
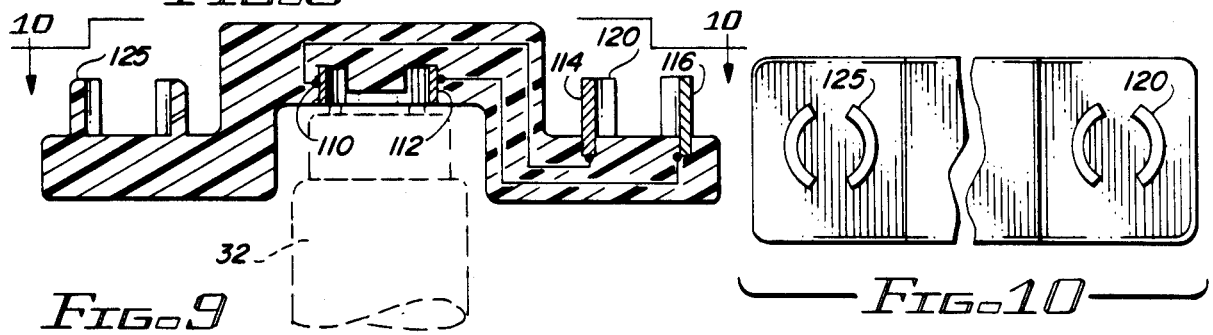

OPTICAL REFLECTOR SYSTEM FOR FLUORESCENT LIGHTING FIXTURES

The present invention relates to fluorescent lighting fixtures and more particularly relates to multilamp fluorescent fixtures incorporating a reflective assembly in place of a removed fluorescent lamp to increase the lighting efficiency of the fixture.

Fluorescent lighting fixtures or luminaires are widely used in office, factory and residential lighting applications. The most common type of fixture is the modular two foot by four foot fixture recessed into a metal suspension system or surface mounted on the ceiling. Fluorescent fixtures with four lamps, each with a nominal wattage of approximately 150 to 200 watts per fixture, are the most economical and widely used constructions. In accordance with conventional construction, two pairs of fluorescent lamps are each connected in series, each activated by ballast. Generally one ballast controls the outer two lamps and the other ballast controls the inner two lamps. The lamps are disposed in a parallel arrangement on either side of a ballast housing within a metal housing or frame, sometimes termed a troffer. Generally, the troffer is coated with a light colored enamel coating which serves as a reflector. A diffuser or lens of translucent or transparent material extends across the opening of the fixture below the fluorescent light tubes.

Even though fluorescent tube fixtures are considerably more efficient than comparable incandescent lighting, users have nevertheless resorted to various means to reduce energy costs by decreasing electrical energy consumption. Generally this is accomplished in a number of ways. One common means is to simply deactivate selected fixtures to reduce energy consumption.

Other approaches have been to improve the configuration of the reflector in the fixture. Generally the reflector, as pointed above, is made of sheet metal or may be made of plastic and reflector modifications generally involve some type of modified parabolic reflector shape in place of the generally flat troffer surfaces. For example, U.S. Pat. No. 3,829,677 discloses the use of a parabolic reflector having a rib along the length of the parabolic vertex of the deflector.

U.S. Pat. No. 4,403,275 suggests an invention in which two of the lamps, for example the outer lamps, are removed and a reflecting assembly is inserted in place of the removed lamps. Each reflecting assembly consists of a rigid reflecting surface and a cap at each longitudinal end. The reflecting surface is variously configured along the length of the remaining inner lamps to re-direct light from the remaining lamps downwardly to areas intended to be illuminated. This illumination would otherwise be directed upwardly and absorbed within the housing. The caps which are inserted in the lamp holder are formed so they do not contact the live elements of the lamp holder. The ballast which ordinarily powers the removed lamps may be disconnected.

Still another approach to improving the efficiency of fluorescent fixtures in which one or more light tubes are removed is shown in U.S. Pat. No. 4,336,576. According to this invention, one of the fluorescent tubes is omitted and the other is in its conventional location. However, the reflector is designed so that light from the upper half of the remaining tube is reflected to a location of the removed tube. In this way, from below the diffuser plate, it appears as though two fluorescent tubes are present in spite of the fact that one has been removed.

In the two aforementioned patents, each requires extensive and expensive modification of the fixtures. With the apparatus of the U.S. Pat. No. 4,403,275 it is necessary to insert the specially configured reflector. With the invention of the U.S. Pat. No. 4,336,576, a specially configured reflector is required. Further, the resulting illumination levels may be insufficient. The modification and retrofitting of specially configured reflectors is expensive and time-consuming.

Accordingly, there exists a need in the art for improvements in lighting systems which allow the removal of a light source in a multiple lamp fluorescent fixture which system is efficient and will result in acceptable light levels and distribution of light. Accordingly, a principal object of the present invention is to provide a lighting apparatus which maximizes the useful light output of a multiple lamp fluorescent fixture when one or more of the lamps are removed.

Briefly, in accordance with an embodiment of the present invention, a reflector system is provided which establishes acceptable lighting levels and coverage without visual detriment while utilizing minimal electric energy. In a specific embodiment of the invention, a fluorescent lighting fixture of standard construction having two ballasts, four standard fluorescent lamps and four corresponding pairs of lamp holders which support and engage the lamps is controlled by a light switch which energizes the two ballasts. The lamps are all removed and a new pair of lamp holders or tombstones are centrally positioned in each half of the troffer at a location intermediate the removed holders or tombstones. The new lamp holders are suitably wired to one of the ballasts. A new reflecting assembly is inserted in each section of the fixture. The reflector consists of a premium grade, pre-finished specular reflective sheet. The reflector sheet is flexible having a length approximately corresponding to the length of fixture and having a width slightly greater than the fixture section in which it is to be installed so that when the reflector is secured in the section it will be virtue of its flexibility assume a generally parabolic configuration. The reflector may be secured in place by one or more mechanical fasteners along the longitudinal edges of the reflector and along the vertex of the parabolic shape which the reflector assumes.

With the curved specular retrofit reflector of the present invention, two-lamp luminaries will de-lamp to one lamp and four-lamp luminaries may be de-lamped to two lamps and so on. The installed cost of efficient and durable reflectors and fluorescent luminaires can be recovered in a short amortization period many times less than one year. If two of the four lamps in the existing fixture can be removed from service, an economically significant reduction in electrical use can be obtained. For example, at 0.08 per kwh, the use of the present invention can represent electrical savings of $90.00 per year on four foot fixtures and up to $160.00 per year on eight foot fixtures.

The present invention allows the lamps to be removed without unacceptable diminution of required lighting levels. Reducing fixture components by one-half will, of course, greatly improve the operating efficiency and reduce maintenance costs by half. Further, air conditioning requirements and costs are also reduced.

The invention will be further understood from the following description taken in conjunction with the accompanying drawings in which:

FIGS. 4A through 4D are cross-sectional views illustrating the sequential steps involved in modifying a fluorescent fixture in accordance with the present invention;

FIG. 6 is a graph illustrating representative zonal illumination resulting from the modification of conventional luminaire according to the present invention;

FIG. 7 is a perspective view of the reflector sheet prior to installation;

FIGS. 8 to 10 illustrate a lamp holder adaptor that may be utilized in carrying out the invention.

Figure 1:
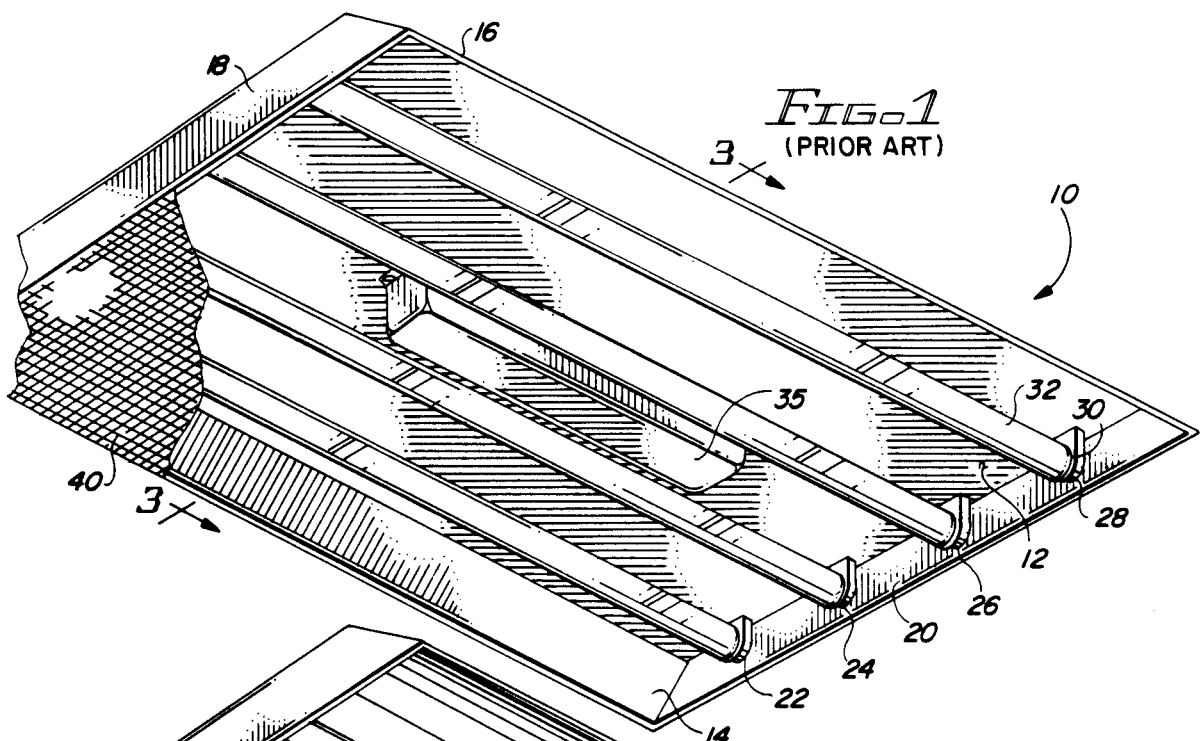
FIG. 1 is a bottom perspective view of a prior art fluorescent lighting fixture.

Referring now to the drawings, particularly FIG. 1, there is illustrated a lighting fixture 10 according to the prior art. The fixture includes a generally rectangular top surface 12 and outwardly diverging side walls 14 and 16 formed as an integral unit. Conventionally, the unit is fabricated from steel which defines a housing having a suitable finish such as baked enamel for reflectivity. End walls 18 and 20 complete the housing and support opposed pairs of lamp holders 22, 24, 26 and 28. The lamp holders engage and support electrical contact pins associated with the cap 30 at either end of longitudinally extending light tubes 32. The pins extend through the cap and are connected to the light filament. As is known in the art, each lamp is secured in the fixture by inserting the pins into the associated lamp holder and rotating the lamp so the pins are secured in the lamp holder and are in electrical contact with the conductive element of the lamp holder. Fluorescent tubes are available in various lengths and wattage ratings. Standard lengths are 24", 36", 40", 48" and 96" with standard nominal wattage ratings of typically 20, 30, 40 or 75 watts.

The fixture is energized through a ballast which is generally contained within longitudinally extending housing 35 secured to the upper housing wall 12. Generally for a four light fixture as shown, two ballast assemblies are provided with one ballast controlling the light tubes associated with the outer pair of holders 22 and 28 and the other ballast connected in series to the inner light holders 24 and 26. A prismatic diffuser plate 40 is removably or hingedly secured at the lower, open end of the housing so that convenient access is provided to the housing interior.

Figure 2:
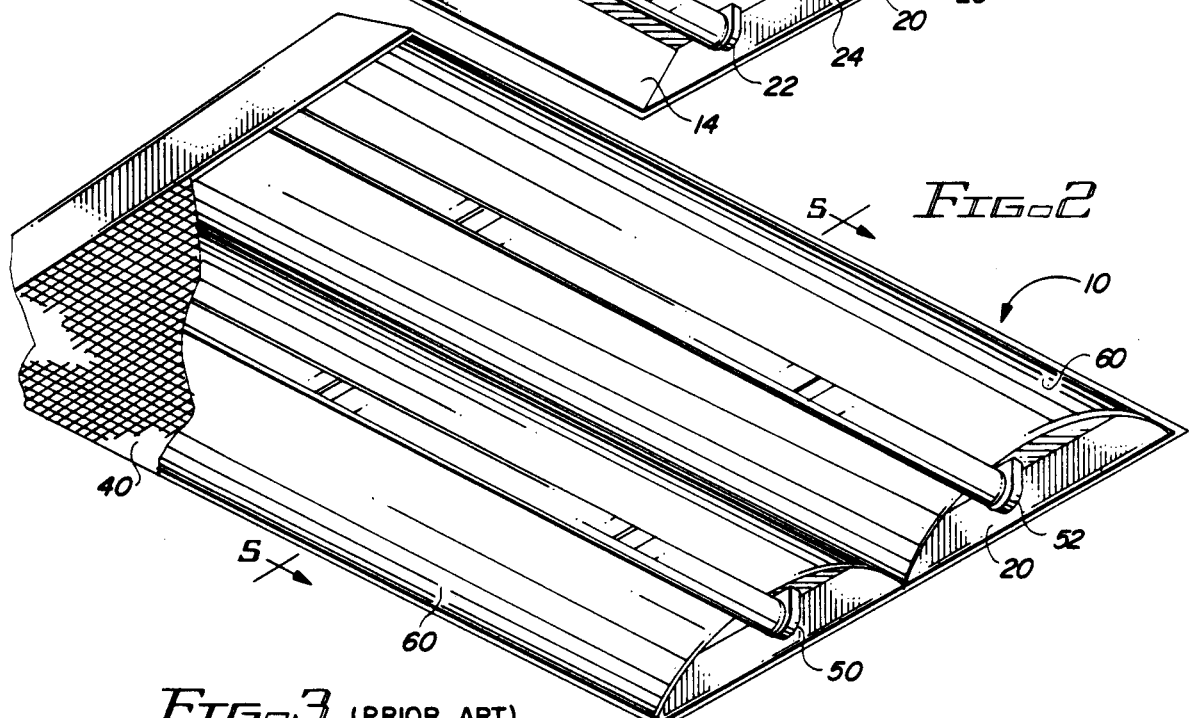
FIG. 2 is a bottom perspective view of a fluorescent lighting fixture modified in accordance with the present invention.
Figure 3:
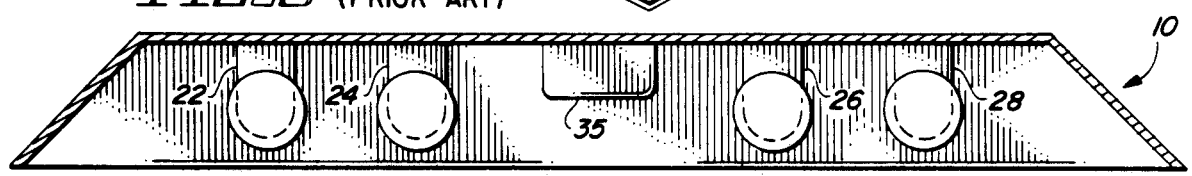
FIG. 3 is a cross-sectional view taken along lines 3—3 of FIG. 1.
Figure 5:
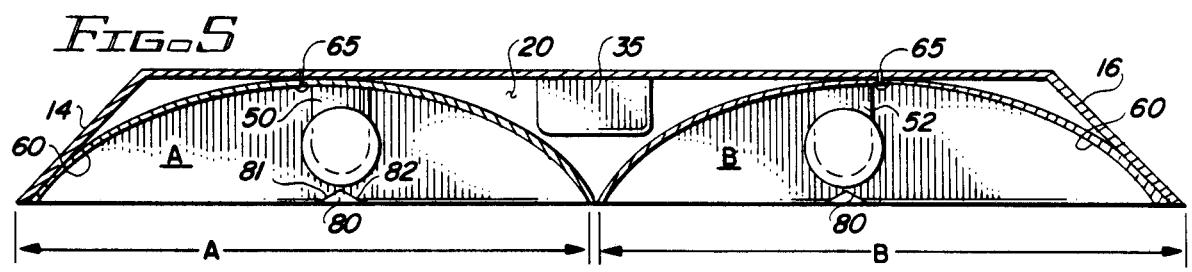
FIG. 5 is a cross-sectional view taken along lines 5—5 of FIG. 2.

In conventional apparatus four light tubes would typically be positioned at the locations as shown in FIG. 1. However, according to the present invention, energy savings are effected by removal of existing tubes and relamping each half of the troffer with less than the original or conventional number of lamps. For example, with a four-lamp fixture having two lamps in either half as shown, the two existing lamps will each be replaced with a single centrally located lamp. Referring to FIGS. 2, 4 and 5, the modification of a conventional fixture according to the present invention is illustrated. The same numerals are used throughout this specification to designate the same or similar elements. The fixture or troffer 10 is first modified by removing the four existing light tubes 32. Further, lamp holders 22, 24 26 and 28 at the opposite ends of the fixture are electrically disconnected from the ballast and, in each half of the fixture 10, a new oppositely disposed pair of connectors or tombstones 50 and 52 are attached to the end walls 18 and 20 of the fixture at centrally located positions. After re-lamping, a replacement optical reflector system is installed to enhance the illumination emitted from the replacement lamps. The system provides maximum required light level and coverage without visual detriment while effectively and efficiently utilizing a minimal amount of electrical energy.

As seen in FIG. 7, the replacement reflector consists of a flat, rectangular sheet 60 of reflector material having predetermined dimensions so that upon installation, the flexible reflector material will assume a generally parabolic shape in each half of the troffer. Typically, the retrofit reflector sheets 60 are fabricated from a pre-finished specular or mirror-like reflector material having a source image reflectance rating of at least forty percent (40%) measured and with the reflector grain line running parallel to the light source. The material should be provided with a hard coat anodic finish which is resistant to atmospheric conditions. The specular reflecting surface is protected by a transparent hard coating preferably with hardness and abrasion resistance greater than that of glass. For this purpose, the preferred material is a super high purity non-clad aluminum, having at least a two micron thick anodic oxide hard coating. The material is fabricated by electrochemical processing rather than mechanical polish to preserve the integrity of the reflector surface. The total reflectivity factor should be greater than ninety percent (90%) with optical specularity greater than eighty-five percent (85%). Other important specifications require thermal tolerance so that the material is not affected by temperature extremes from as low as fifty degrees below to five hundred degrees F. Such material can be provided in coil or sheet form and cut to a planar sheet size consistent with the particular installation. The material has a typical thickness of 0.010" to 0.050" so that it is readily flexible to assume the proper parabolic shape.

When the new connectors are installed, one of the ballast assemblies which ordinarily power the replaced lamps should be electrically disconnected to eliminate power loss and for safety purposes. The disconnected ballast can be entirely removed from the unit or may be simply contained in the unit in a disconnected condition. The re-lamping procedure is illustrated in FIGS. 4A and 4B.

The reflective material is cut to proper size at the location or may be pre-cut in accordance with the geometry of the troffer or fixture. Ideally, the reflector will have an overall longitudinal dimension L closely corresponding to the overall length of the fixture. The normal transverse planar width W of the material is selected so as to be greater than dimension A as shown in FIG. 5. Normally, this width dimension will be approximately 8% greater than the dimension A shown. A second similar reflector is also provided for the opposite or B section of the troffer 10. In the B section of the troffer, the lamps 26 and 28 have been removed and new centrally located connectors 52 are installed as shown in FIG. 5.

The two new reflector sheets 60 may now be easily and conveniently installed in the A and B halves of the troffer by simply inserting them to the position shown in FIGS. 4C and 4D. When the reflector sheet 60 is inserted in this position, their flexibility permits them assume a general parabolic shape as shown. The outer edges of each reflector are placed in a position engaging the lower edge of the side walls 14 and 16 of the troffer. Generally there is a break or a bend at this location on the side wall which facilitates engagement of the outer edges of the reflector with the troffer. The inner opposite edges of the reflector sheets may be simply overlapped in a V-configuration as shown. The longitudinally extending apex of the parabolic reflector will engage the inner surface of the troffer in each half and may be secured thereto by mechanical fasteners such as sheet metal screws 65, as shown. In conventional configurations, the ballast housing assembly 35 will also engage the upper surface of the reflector to secure it in place.

Once the reflectors are installed, a lamp is secured in each section of the fixture with the contact pins engaging the tombstones 50, 52. As is known, when the lamps are rotated they are locked in place in electrical contact with the contacts in the tombstones.

In order to test the effectiveness of the present invention, a prior art fixture as described above with reference to FIG. 1 was utilized. The prior art fixture was originally provided with four F40T12/CW fluorescent lamps having a lumen rating of 3150 LEMS. The troffer was a commercially available 2×4 foot recessed troffer with a white interior having standard pattern 12 lens. The ballast were Advance RQM-2S40. Overall width of the troffer was 24 inches and the overall height 5.7 inches with the spacing between the centerlines of each adjacent set of lamps being 5 inches. The fixture was modified as shown in FIGS. 4A to 4D with the reflector material being a super high purity aluminum, nonclad, having a hard-coat 2 micron thick anodic oxide. The total reflectivity factor was 90.6% with optical specularity of 86.5%.

FIG. 6 illustrates a luminance summary in foot lammers of the fixture as modified according to the present invention. The two F40T12/CW fluorescent lamps were each replaced with a single centrally positioned fluorescent lamp of the same rating in each section of the fixture. The test was conducted in accordance with IES procedures. The test distance was eight meters or 26 feet. The overall lighting efficiency obtained was 62.6%.

The following chart summarizes candle power, zonal lumens and percentages resulting from the test:

| CANDLEPOWER SUMMARY | | | | | | OUTPUT |
|---|---|---|---|---|---|---|
| ANGLE | ACROSS | 67.5 | 45 | 22.5 | ALONG | LUMENS |
| 0 | 2114 | 2114 | 2114 | 2114 | 2114 | |
| 5 | 2113 | 2098 | 2102 | 2085 | 2080 | 200 |
| 10 | 2079 | 2069 | 2069 | 2048 | 2037 | |
| 15 | 2009 | 2005 | 2009 | 1992 | 1980 | 565 |
| 20 | 1895 | 1902 | 1914 | 1908 | 1901 | |
| 25 | 1747 | 1762 | 1785 | 1793 | 1798 | 820 |
| 30 | 1582 | 1599 | 1627 | 1643 | 1666 | |
| 35 | 1410 | 1425 | 1450 | 1464 | 1502 | 908 |
| 40 | 1239 | 1248 | 1261 | 1265 | 1311 | |
| 45 | 1065 | 1067 | 1069 | 1058 | 1104 | 829 |
| 50 | 887 | 885 | 880 | 860 | 896 | |
| 55 | 714 | 712 | 702 | 679 | 703 | 633 |
| 60 | 557 | 555 | 543 | 525 | 537 | |
| 65 | 424 | 423 | 409 | 397 | 405 | 414 |

| -continued | | | | | | |
|---|---|---|---|---|---|---|
| CANDLEPOWER SUMMARY | | | | | | OUTPUT |
| ANGLE | ACROSS | 67.5 | 45 | 22.5 | ALONG | LUMENS |
| 70 | 318 | 314 | 302 | 293 | 302 | |
| 75 | 229 | 225 | 214 | 208 | 216 | 232 |
| 80 | 149 | 145 | 137 | 133 | 140 | |
| 85 | 73 | 70 | 67 | 65 | 68 | 75 |
| 90 | 0 | 0 | 0 | 0 | 0 | |

| ZONAL LUMENS AND PERCENTAGES | | | |
|---|---|---|---|
| ZONE | LUMENS | % LAMP | % FIXTURE |
| 0–30 | 1584 | 25.97 | 33.88 |
| 0–40 | 2492 | 40.86 | 53.30 |
| 0–60 | 3954 | 64.82 | 84.56 |
| 0–90 | 4675 | 76.65 | 100.00 |
| 40–90 | 2183 | 35.80 | 46.70 |
| 60–90 | 721 | 11.83 | 15.44 |
| 90–180 | 0 | 0.00 | 0.00 |
| 0–180 | 4675 | 76.65 | 100.00 |

EFFICIENCY = 76.7%

| LUMINANCE SUMMARY-FOOTLAMBERTS | | | |
|---|---|---|---|
| ANGLE | ACROSS | 45 | ALONG |
| 45 | 696 | 699 | 719 |
| 55 | 575 | 566 | 564 |
| 65 | 464 | 447 | 441 |
| 75 | 408 | 380 | 384 |
| 85 | 389 | 354 | 360 |

S/MH = 1.1
SC(ALONG) = 1.1

In some instances it will be helpful to provide an additional reflecting surface to reflect substantially all light emitted on the reflecting surface. As shown in FIG. 5, an additional reflector 80 constructed of the same specular optical material is provided extending longitudinally beneath the elongate fluorescent lamp within each section of the fixture. The reflector is preferably spaced below the centerline of the light tube and has two planar surfaces 81, 82 intersecting in a general V-formation forming an angle of approximately 90°. Thus, the planar surfaces reflect the light to outer edges of the parabolic reflector 60 where it is redirected downwardly to more fully distribute the light over the entire area of the diffuser.

FIGS. 8, 9 and 10 illustrate an adapter 100 that may be utilized in connection with the present invention for replacing a pair of lamps with a single lamp 32. The connector 100 is fabricated from an electrically insulated material and is engageable in the existing lamp holders or tombstones 22 and 24. Lamp holder 100 has an intermediate section 102 which is axially offset so that in an installed position it transversely aligns with the existing lamp holders. Section 102 defines a socket 106 having electrical conductive elements 110 and 112 which make electrical contact with the pins at the end caps of the lamp 32 when the pins are properly engaged locking the tube in place. Conductive element 110 and 112 are electrically connected to conductive elements 114 and 116 associated with insert 120. Insert 120 is adapted to be engaged within lamp holder 24. Thus, it will be seen that when insert 120 is properly engaged in the lamp holder, the conductive pins associated with lamps 32 are placed in electrical contact with the electrical circuit of the fixture by means of conductive elements 110, 112, 114 and 116. Oppositely positioned insert 125 is adapted to be received in lamp holder 22 and is electrically nonconductive. Holder 22 may be simply disconnected along with its ballast.

It will be appreciated that while the present invention relates primarily to retrofitting existing lighting installations, original or newly manufactured fixtures can be fabricated according to the present invention. The resulting product using aluminum solar reflector sheet with high total reflectivity provides constant optical specularity. It may be desireable to provide a protective surface of a removable polyethylene film prior to installation which may be removed at time of installation. The product is simple to manfacture and easy to install either originally or as a retrofit upgrade. Maintenance requirements are minimal as the optical surface can be easily cleaned periodically with a mild detergent.

The use of a flexible reflector sheet makes the invention particularly applicable to retrofit applications. The sheets can be provided in conventional sizes or can be provided and coil cut at the job site. No special tooling is required and installation can be accomplished in a short time by workmen without any special tools or training.

It will be appreciated that the invention can be adapted to almost any size and configuration of fluorescent lamp fixture and provides effective and uniform illumination.

It will be understood that the present specification describes certain preferred embodiments of the present invention. It will be obvious to those skilled in the art to make various changes, alterations and modifications without departing from the spirit and scope of the appended claims.

I claim:

1. In a fluorescent lighting fixture of the type having at least two fluorescent light tubes within a housing, which housing has first and second conventional lamp holders disposed at opposite ends of the housing which receive connector pins at the end of said fluorescent light tubes, the improvement comprising:
   (a) a pair of replacement lamp holders at the opposite ends of the lighting fixture at a location intermediate the location of the said first and second conventional lamp holders, each said replacement lamp holder having a body with a socket at an intermediate location adapted to receive the said pins of the lamp tube, each said replacement lamp holders further having first insert means adapted to be engaged with said first conventional lamp holder and second insert means adapted to be engaged with said second spaced-apart conventional lamp holder, said socket and said first insert means being in electrical connection; and
   (b) reflector means positioned above said replacement lamp holders, said reflector means being provided in a general planar condition having a reflective surface and having predetermined flexibility whereby when installed in the fixture, said reflector will assume a generally parabolic shape established by the geometry of the fixture.

2. The lighting apparatus of claim 1 wherein said reflector means is specular quality aluminim having a high reflective efficiency.

3. The apparatus of claim 1 including second reflector means positioned below the replacement lamp adapted to reflect light impinging thereon to said reflector to be redirected to an illuminated space.

* * * * *